(12) United States Patent
Khan et al.

(10) Patent No.: US 11,845,443 B2
(45) Date of Patent: Dec. 19, 2023

(54) GEOMETRY-BASED MODEL FOR ROAD EDGE DETECTION AT INTERSECTIONS

(71) Applicant: GM Global Technology Operations LLC, Detroit, MI (US)

(72) Inventors: Mubassira Khan, Austin, TX (US); Najah Ghalyan, Austin, TX (US); Mason David Gemar, Cedar Park, TX (US); Kaydee Hartmann, Austin, TX (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 149 days.

(21) Appl. No.: 17/463,698

(22) Filed: Sep. 1, 2021

(65) Prior Publication Data
US 2023/0066167 A1    Mar. 2, 2023

(51) Int. Cl.
*B60W 40/10* (2012.01)
*G08G 1/07* (2006.01)

(52) U.S. Cl.
CPC ............... *B60W 40/10* (2013.01); *G08G 1/07* (2013.01); *B60W 2420/42* (2013.01); *B60W 2552/30* (2020.02); *B60W 2552/53* (2020.02); *B60W 2554/4049* (2020.02)

(58) Field of Classification Search
CPC ............. B60W 40/10; B60W 2552/53; B60W 2552/30; B60W 2554/4049; B60W 2420/42; G08G 1/07
See application file for complete search history.

(56) References Cited

U.S. PATENT DOCUMENTS

| | | | | |
|---|---|---|---|---|
| 2020/0062244 A1* | 2/2020 | Iimura | ................ | B60W 30/095 |
| 2020/0094828 A1* | 3/2020 | Ohmura | ................ | B60W 50/082 |
| 2020/0180612 A1* | 6/2020 | Finelt | ................... | G05D 1/0088 |
| 2021/0101616 A1* | 4/2021 | Hayat | ..................... | G06F 18/21 |
| 2023/0053785 A1* | 2/2023 | Carvalho | ............... | G06V 20/58 |
| 2023/0066167 A1* | 3/2023 | Khan | ............. | B60W 30/18159 |

* cited by examiner

*Primary Examiner* — Peter D Nolan
*Assistant Examiner* — Wae L Louie
(74) *Attorney, Agent, or Firm* — CANTOR COLBURN LLP

(57) ABSTRACT

A system, map server and method of navigating a vehicle through an intersection. The map server includes a remote processor and a communication device. The remote processor determines a first road edge for a first road entering an intersection and a second road edge for a second road entering the intersection. The remote processor constructs an intersection edge that connects a first point on the first road edge to a second point on the second road edge. The communication device communicates the intersection edge to the vehicle. A vehicle processor at the vehicle navigates the vehicle through the intersection using the intersection edge.

20 Claims, 10 Drawing Sheets

GEOMETRY-BASED MODEL FOR ROAD EDGE DETECTION AT INTERSECTIONS

INTRODUCTION

The subject disclosure relates to constructing a road edge in a map and, in particular, to a system and method for constructing a road edge for an intersection in a map.

Detecting the edges of a road is integral to creating a vehicle path that guides an autonomous vehicle along the road. Intersections are an integral part of a road network and can have many different configurations, making the task of road and lane edge detection challenging. While aerial imagery can be used for road edge inference, detecting a road edge from this source at an intersection can be hampered by faded road markings, low quality images, and/or occlusion by the presence of foliage, buildings, or other objects. Furthermore, while crowd-sourced vehicle data can be used to detect road edges, this method requires expensive map-matching efforts and can be prone to issues of noise and data sparsity. Accordingly, it is desirable to be able to construct a road edge at an intersection shown in a map based on knowledge of road edges in the vicinity of the intersection.

SUMMARY

In one exemplary embodiment, a method of navigating a vehicle through an intersection is disclosed. A first road edge for a first road entering the intersection is determined at a remote processor. A second road edge for a second road entering the intersection is determined at the remote processor. An intersection edge that connects a first point on the first road edge to a second point on the second road edge is constructed at the remote processor. The intersection edge is transmitted to the vehicle for navigation of the vehicle through the intersection using the intersection edge.

In addition to one or more of the features described herein, a nominal turn radius is determined for the intersection edge based on an intersection configuration and intersection angle between the first road edge and the second road edge. The method further includes determining a tangent distance based on the intersection angle and the nominal turn radius. The method further includes determining a location of the first point on the first road edge with respect to the point of intersection and a location of the second point on the second road edge with respect to the point of intersection using the tangent distance. The method further includes determining a turn center of the intersection edge using a first radial line extending from the first point and a second radial line extending from the second point. The method further includes determining the intersection edge by interpolating an intersection radial line based on rotation angle to coincide with the first point and the second point. The intersection can include at least one of a horizontal curve and a lane transition.

In another exemplary embodiment, a map server for vehicle navigation is disclosed. The map server includes a processor and a communication device. The processor is configured to determine a first road edge for a first road entering an intersection, determine a second road edge for a second road entering the intersection, and construct an intersection edge that connects a first point on the first road edge to a second point on the second road edge. The communication device is configured to communicate the intersection edge to the vehicle for navigation through the intersection using the intersection edge.

In addition to one or more of the features described herein, the processor is further configured to determine a nominal turn radius for the intersection edge based on an intersection configuration and intersection angle between the first road edge and the second road edge. The processor is further configured to determine a tangent distance based on the intersection angle and the nominal turn radius. The processor is further configured to determine a location of the first point on the first road edge with respect to the point of intersection and a location of the second point on the second road edge with respect to the point of intersection using the tangent distance. The processor is further configured to determine a turn center of the intersection edge using a first radial line extending from the first point and a second radial line extending from the second point. The processor is further configured to determine the intersection edge by interpolating an intersection radial line based on rotation angle to coincide with the first point and the second point. The intersection can include at least one of a horizontal curve and a lane transition.

In yet another exemplary embodiment, a system for navigating a vehicle is disclosed. The system includes a remote processor and a vehicle processor. The remote processor is configured to determine a first road edge for a first road entering an intersection, determine a second road edge for a second road entering the intersection, and construct an intersection edge that connects a first point on the first road edge to a second point on the second road edge. The vehicle processor is configured to navigate the vehicle through the intersection using the intersection edge.

In addition to one or more of the features described herein, the remote processor is further configured to determine a nominal turn radius for the intersection edge based on an intersection configuration and intersection angle between the first road edge and the second road edge. The remote processor is further configured to determine a tangent distance based on the intersection angle and the nominal turn radius and determine a location of the first point on the first road edge with respect to the point of intersection and a location of the second point on the second road edge with respect to the point of intersection using the tangent distance. The remote processor is further configured to determine a turn center of the intersection edge using a first radial line extending from the first point and a second radial line extending from the second point. The remote processor is further configured to determine the intersection edge by interpolating an intersection radial line based on rotation angle to coincide with the first point and the second point. The intersection can include at least one of a horizontal curve and a lane transition.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
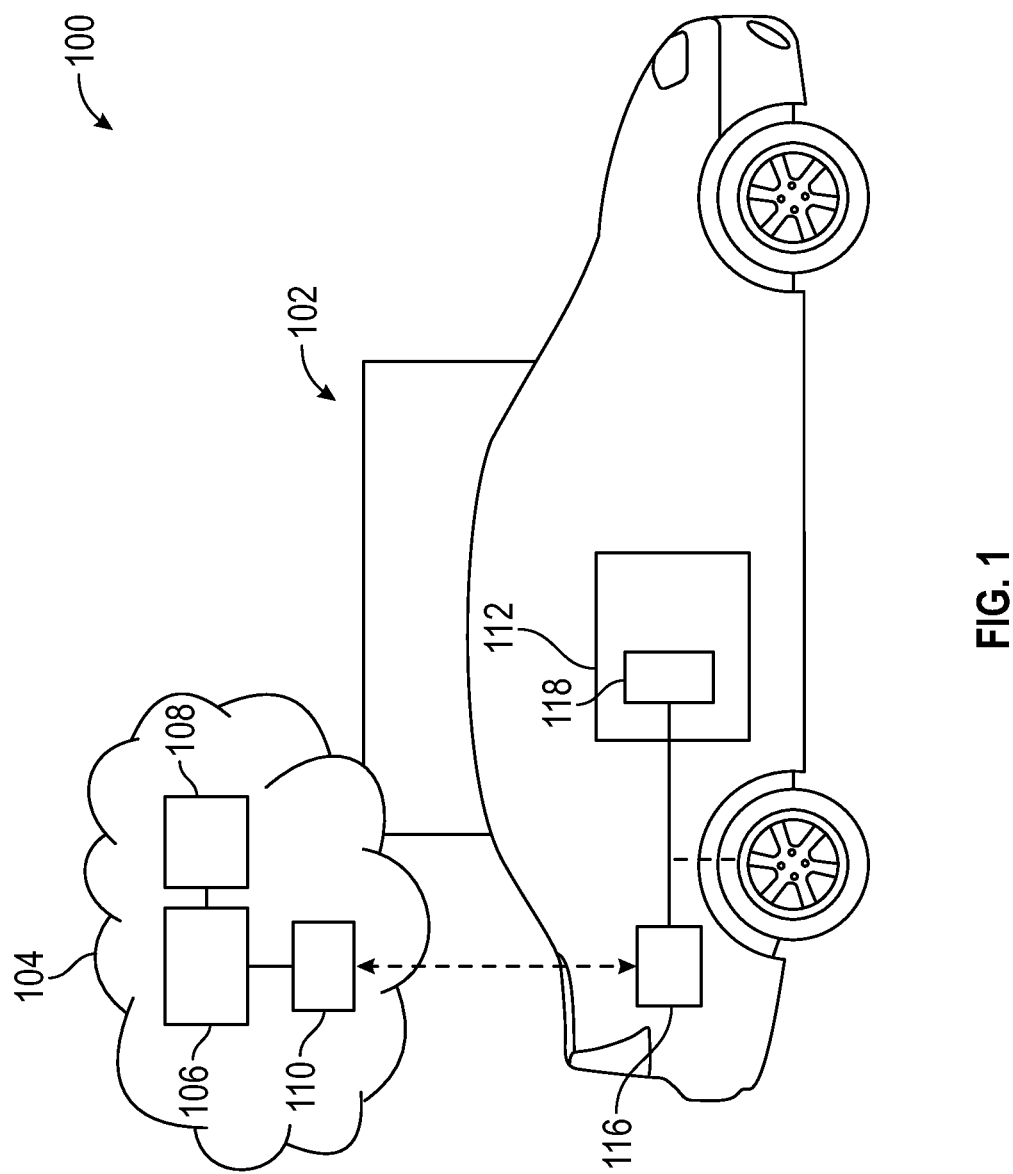
FIG. 1 shows a vehicle in an illustrative embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a system 100 for navigating a vehicle 102. The system 100 includes the vehicle 102 and a remote server 104 in communication with the vehicle 102. In various embodiments, the remote server 104 is a map server. The map server includes a remote processor 106, a memory storage device 108 and a server communication device 110. The memory storage device 108 stores maps including map features. The remote processor leverages a map from the memory storage device 108 and constructs a map feature from the map that can be used by the vehicle 102 for navigation purposes, using the methods disclosed herein. In particular, the remote processor 106 can fill in missing road edges in the map, in particular, at an intersection shown in the map. The server communication device 110 transmits the map or map feature to the vehicle 102.

The vehicle 102 includes at least a controller 112 and a vehicle communication device 116. The vehicle communication device 116 is in communication with the remote server 104 via the server communication device 110. The controller 112 receives the map or map feature and navigates the vehicle 102 through its environment and surroundings based the map or map feature. The controller 112 includes a vehicle processor 118 for navigating the vehicle using the map or map features. The vehicle processor 118 can control various system of the vehicle, such as a steering system, a braking system, a propulsion system, etc.

Figure 2:
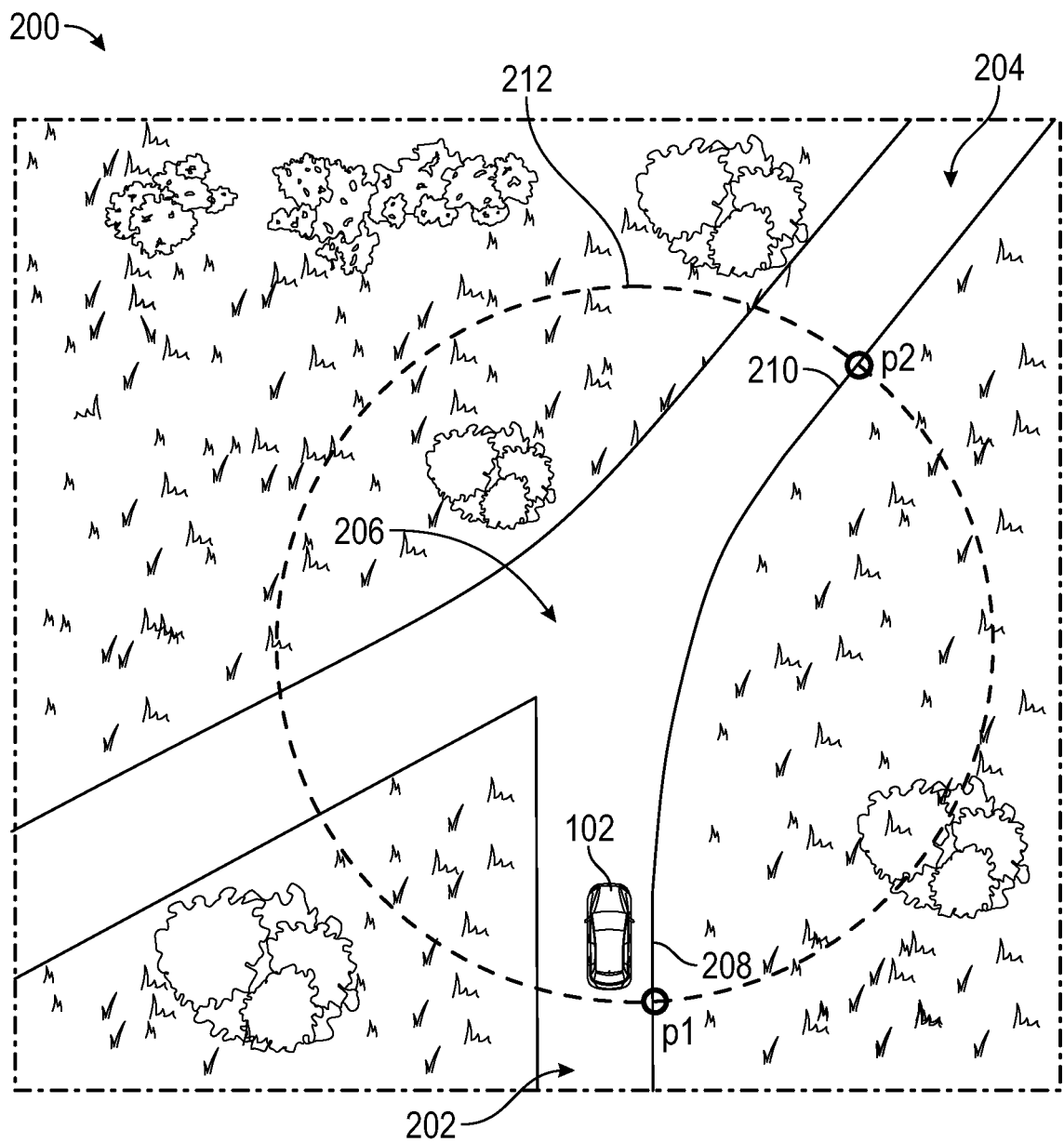
FIG. 2 shows an aerial image of an intersection as provided in an illustrative map.

FIG. 2 shows an aerial image 200 of an intersection as provided in an illustrative map. The aerial image 200 includes an intersection between two roads and known road edges that can be used to generate an intersection edge. The aerial image 200 or map includes a first road 202 and a second road 204 that meet at an intersection 206. The first road 202 includes a first road edge 208 that extends up to the intersection 206. The second road 204 includes a second road edge 210 that extends up to the intersection 206. The first road edge 208 and the second road edge 210 can be provided from a map server (e.g., the remote server 104) that provides the aerial image 200. The first road edge 208 and the second road edge 210 are drawn for an illustrative scenario in which a vehicle 102 makes a right turn from the first road 202 onto the second road 204 at the intersection 206. In alternative embodiments, road edges and intersection edges can be selected for any suitable turn or maneuver made by the vehicle 102. As evident in FIG. 2, an intersection edge is not available in the aerial image 200. The absence of the intersection edge can be due to various reasons, such as occlusions, faded road markings, low image quality, etc. The methods described herein fill in an intersection edge using the first road edge 208 and the second road edge 210.

A circle 212 is drawn around the intersection 206. The circle 212 represents a region of interest with respect to the intersection 206. In general, the circle 212 is centered at the intersection 206 and is drawn large enough to include the intersection 206 and at least a portion of the first road 202 and the second road 204. The circle 212 intersects both the first road edge 208 and the second road edge 210. The circle 212 intersects the first road edge 208 at a first perimeter point P1 and intersects the second road edge 210 at a second perimeter point P2.

Figure 3:
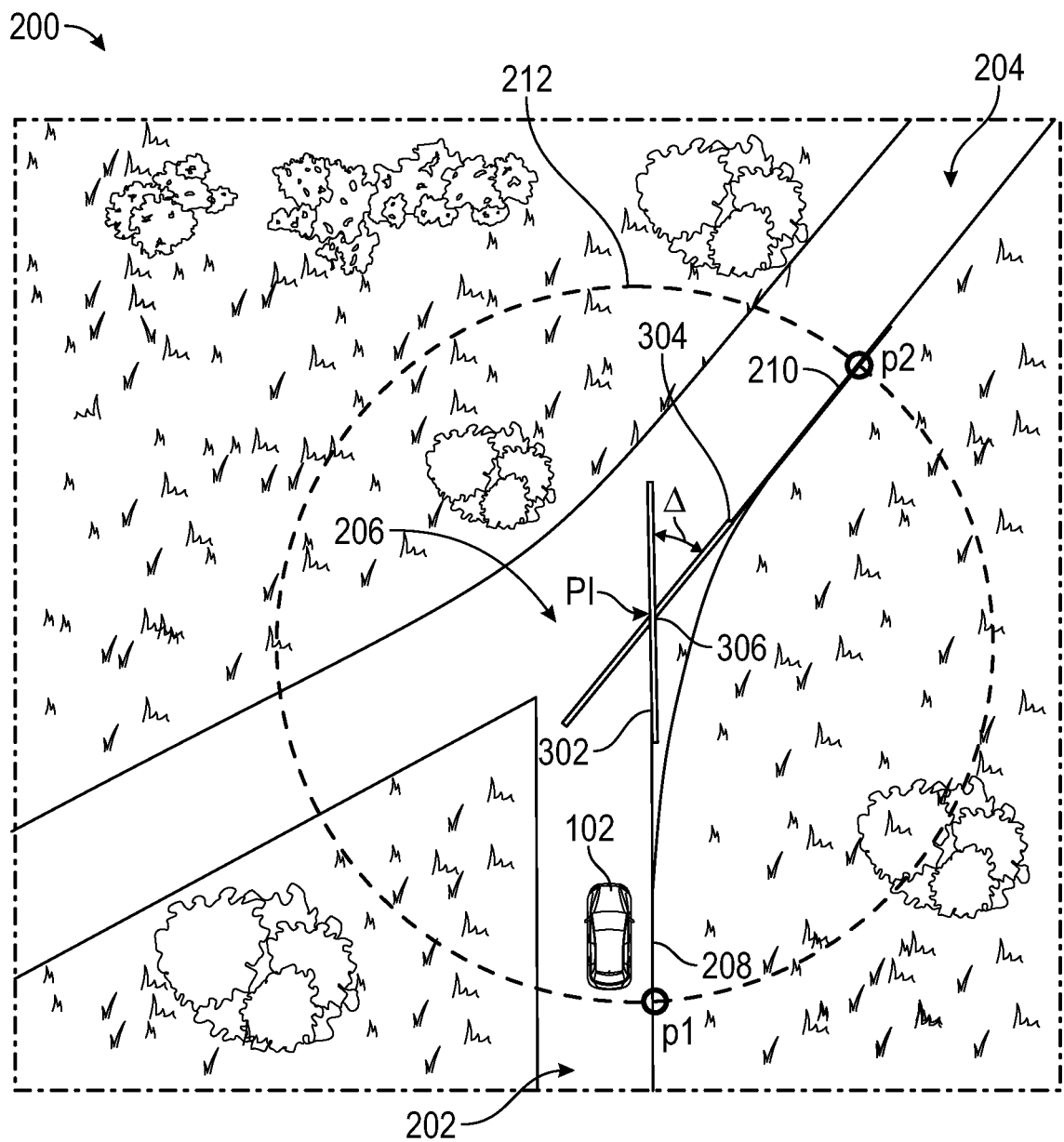
FIG. 3 shows the aerial image with extension lines that extend road edges into the intersection.

FIG. 3 shows the aerial image 200 with extension lines that extend road edges into the intersection. By selecting two points along the first road edge 208 (e.g., first perimeter point P1 and another point along the first road edge 208), a first extension line 302 can be drawn, formed, or constructed that extends the first road edge 208 into the intersection 206. Similarly, by selecting two points on the second road edge 210 (e.g., second perimeter point P2 and another point along the second road edge 210), a second extension line 304 can be drawn that extends the second road edge 210 into the intersection 206. The first extension line 302 and the second extension line 304 intersect at a point of intersection 306 (PI). The first extension line 302 and the second extension line 304 form an intersection angle Δ at the point of intersection PI. As the vehicle 102 turns from travelling along the first road 202 to travelling along the second road 204, it turns through the intersection angle Δ.

Once the point of intersection PI is determined, a nominal turn radius R can be found that represents a radius of a circular arc. The nominal turn radius R can be either a constant value or calculated as a function of the intersection angle Δ, as shown in the relation of Eq. (1):

$$R = \begin{cases} 6.1 \text{ m} & \Delta = 90° \pm 5° \\ 0.00383242\exp(0.0819172(180-\Delta))m & \text{elsewhere} \end{cases} \quad (1)$$

When the intersection angle Δ is substantially a ninety-degree angle, the nominal turn radius is the standardized value (i.e., 6.1 meters). For an intersection angle that is outside of the angular range of 90°±5°, the nominal turn radius can be computed using the equation shown on the second line of Eq. (1).

Figure 4:
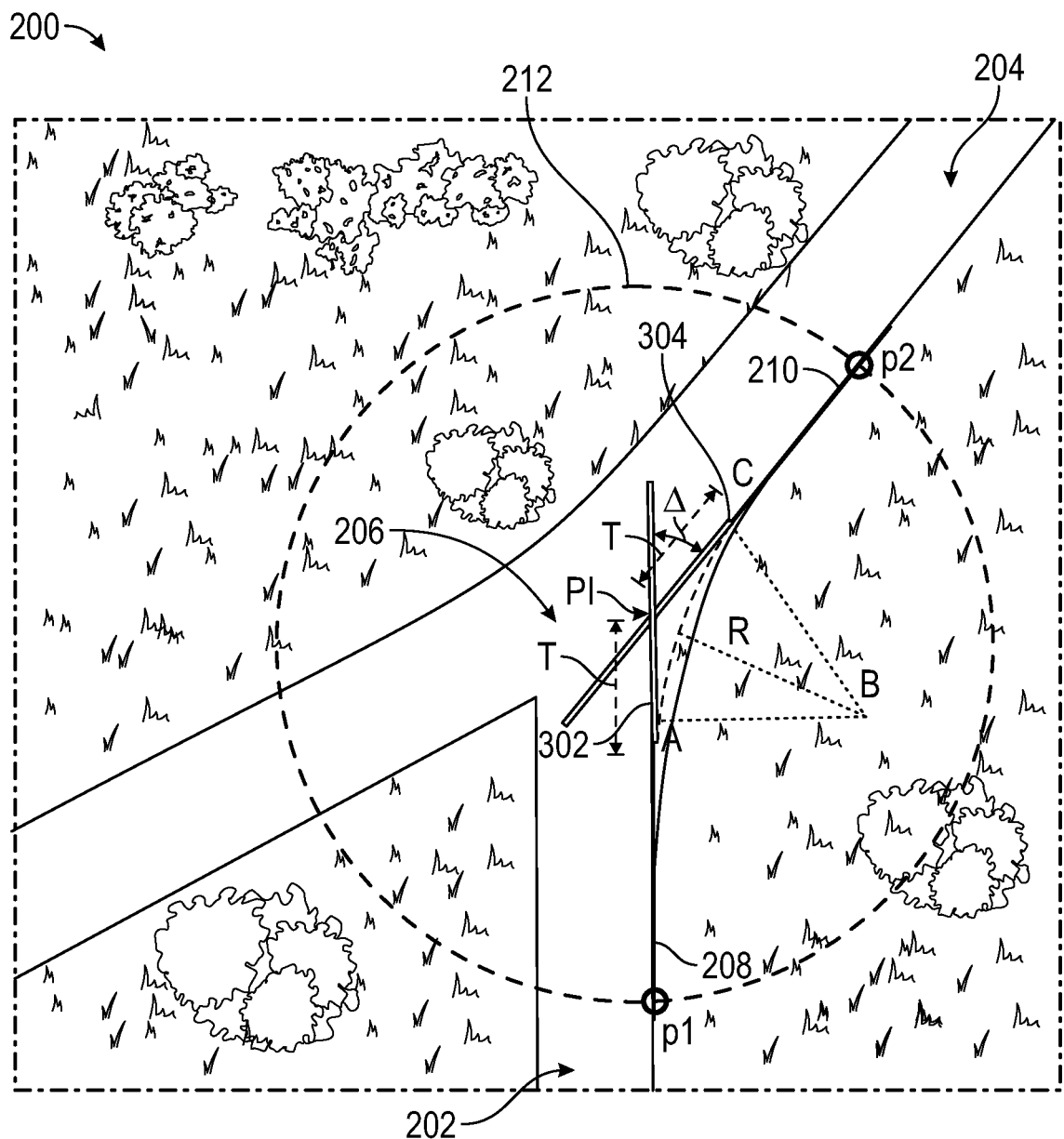
FIG. 4 illustrates a nominal turn radius in relation to the intersection.

FIG. 4 illustrates a nominal turn radius R in relation to the intersection 206. A line AB drawn perpendicular to the first road edge 208 and a line CB drawn perpendicular to the second road edge 210 will intersect to form a quadrilateral ABC(PI). From simple geometry, it can be shown that the angle ABC is the same as the intersection angle Δ. Therefore, the nominal turn radius R obtained via Eq. (1) and the intersection angle Δ can be used to determine a tangent distance T, as shown in Eq. (2):

$$T = R\tan\frac{\Delta}{2} \quad (2)$$

The tangent distance T is used to determine a location of a point of curvature PC and a location of a point of tangency PT.

Figure 5:
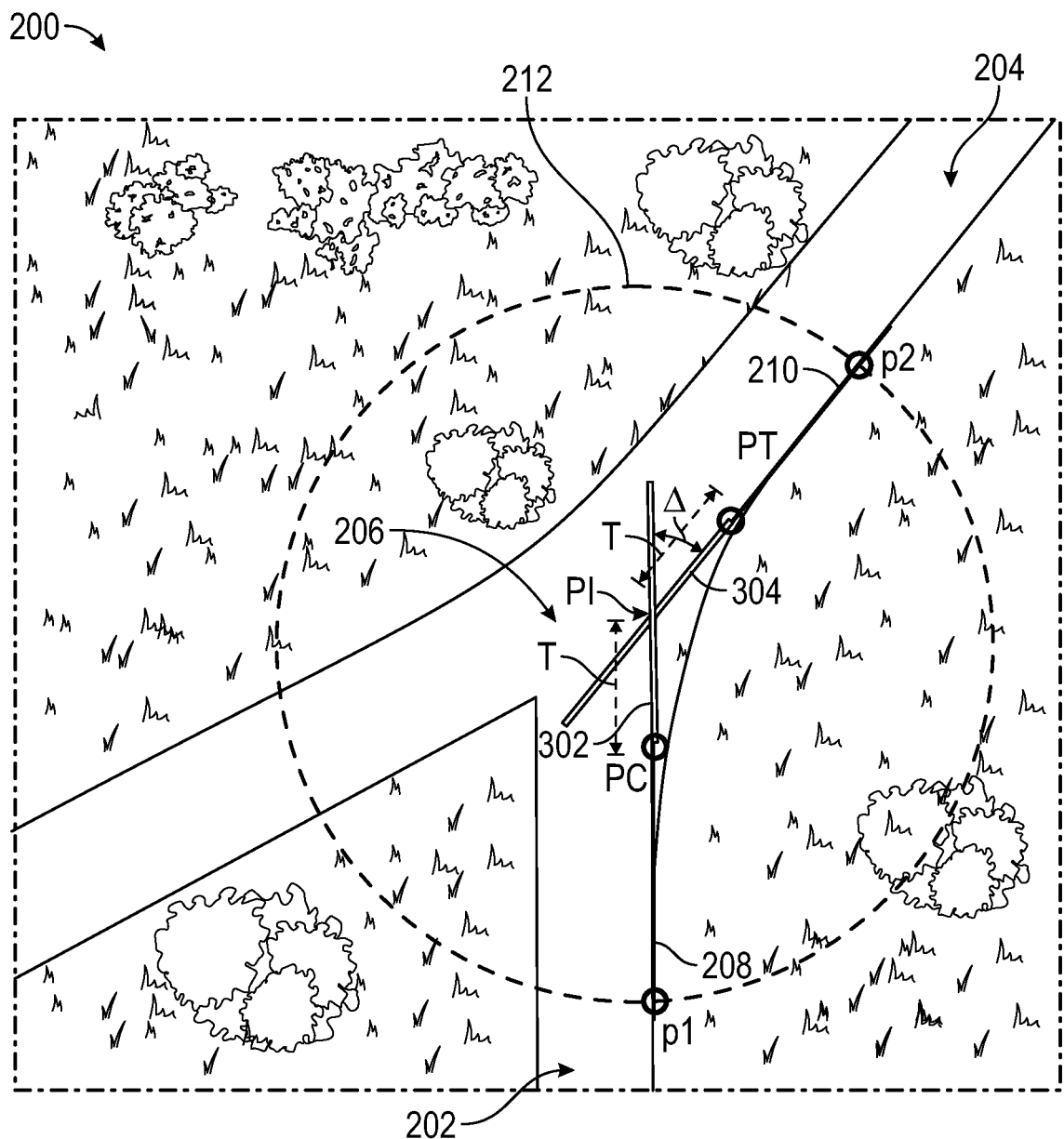
FIG. 5 shows the location of the point of curvature and of the point of tangency in the aerial image.

FIG. 5 shows the location of the point of curvature PC and of the point of tangency PT in the aerial image. The point of curvature PC is located along the first extension line 302 (or first road edge 208) and is separated from the point of intersection PI by the tangent distance T. The point of tangency PT is located along the second extension line 304 (or second road edge 210) and is separated from the point of intersection PI by the tangent distance T.

Figure 6:
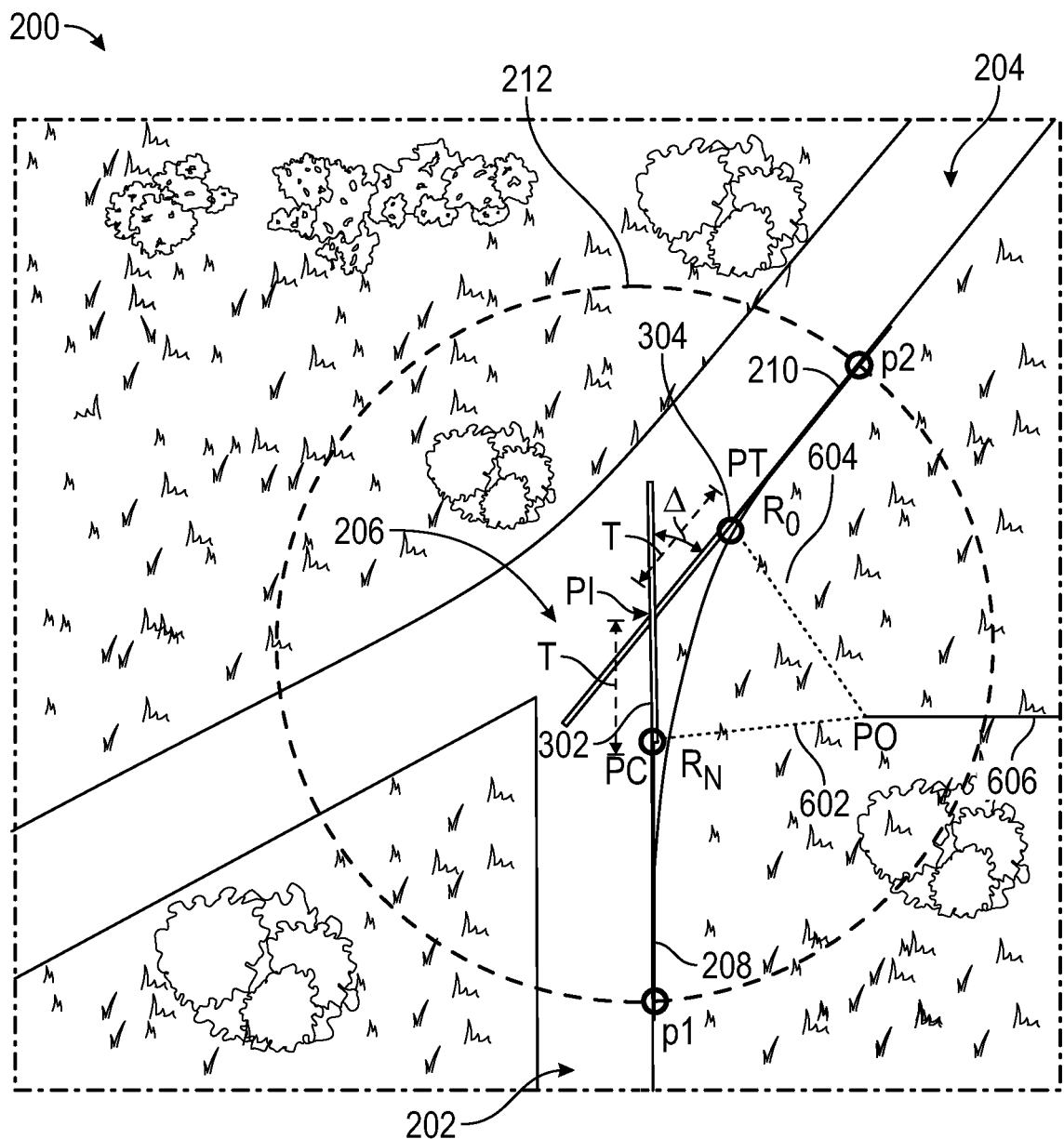
FIG. 6 shows a turn center PO that is determined from the point of curvature and the point of tangency.

FIG. 6 shows a turn center PO that is determined from the point of curvature PC and the point of tangency PT. Once the location of PC and of PT have been determined, a first radial line 602 is drawn perpendicular to the first extension line 302 (or first road edge 208) from the point of curvature PC, and a second radial line 604 is drawn perpendicular to the second extension line 304 (or second road edge 210) from the point of tangency PT. The first radial line 602 and the second radial line 604 intersect at turn center PO. A reference line 606 can be drawn from the point PO that can be used to determine angles for drawing in an intersection edge based on the first radial line 602 and the second radial line 604. The reference line 606 can be an east-west line within the aerial image 200.

Figure 7:
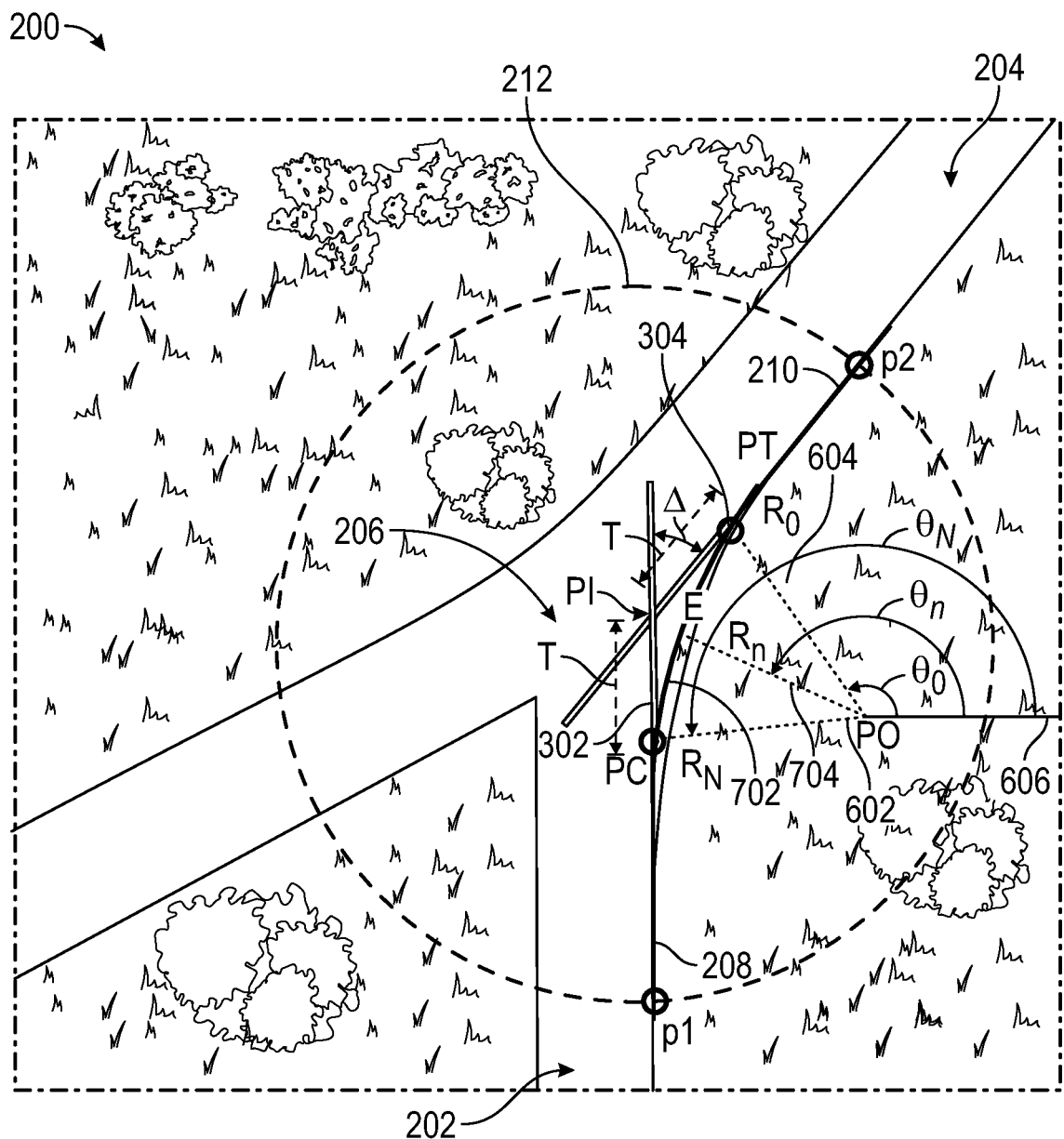
FIG. 7 shows an intersection edge drawn onto the aerial image.

FIG. 7 shows an intersection edge 702 drawn onto the aerial image 200. The aerial image 200 shows the respective angles of the first radial line 602 and second radial line 604 with respect to the reference line 606. A first angle $\theta_0$ is drawn between the reference line 606 and the first radial line 602. A second angle $\theta_N$ is drawn between the reference line 606 and the second radial line 604. An intersection radial line 704 is rotated between the first angle $\theta_0$ to the second angle $\theta_N$ to draw in the intersection edge 702. The length of the intersection radial line 704 changes with rotation angle $\theta_n$ to meet boundary conditions. For example, when $\theta_n=\theta_0$, then $R_n=R_0$ and when $\theta_n=\theta_N$, then $R_n=R_N$. These boundary conditions are satisfied when the intersection edge 702 is parameterized by Eqs. (3) and (4):

$$R_n = \frac{N-n}{N}R_0 + \frac{n}{N}R_N \qquad (3)$$

and $$\theta_n = \frac{N-n}{N}\theta_0 + \frac{n}{N}\theta_N$$

where 0<=n<=N. The intersection edge 702 is formed at the end of the radial line $R_n$ opposite the turn center PO. Use of Eqs. (3) and (4) performs an interpolation for constructing the intersection edge 702.

Figure 8:
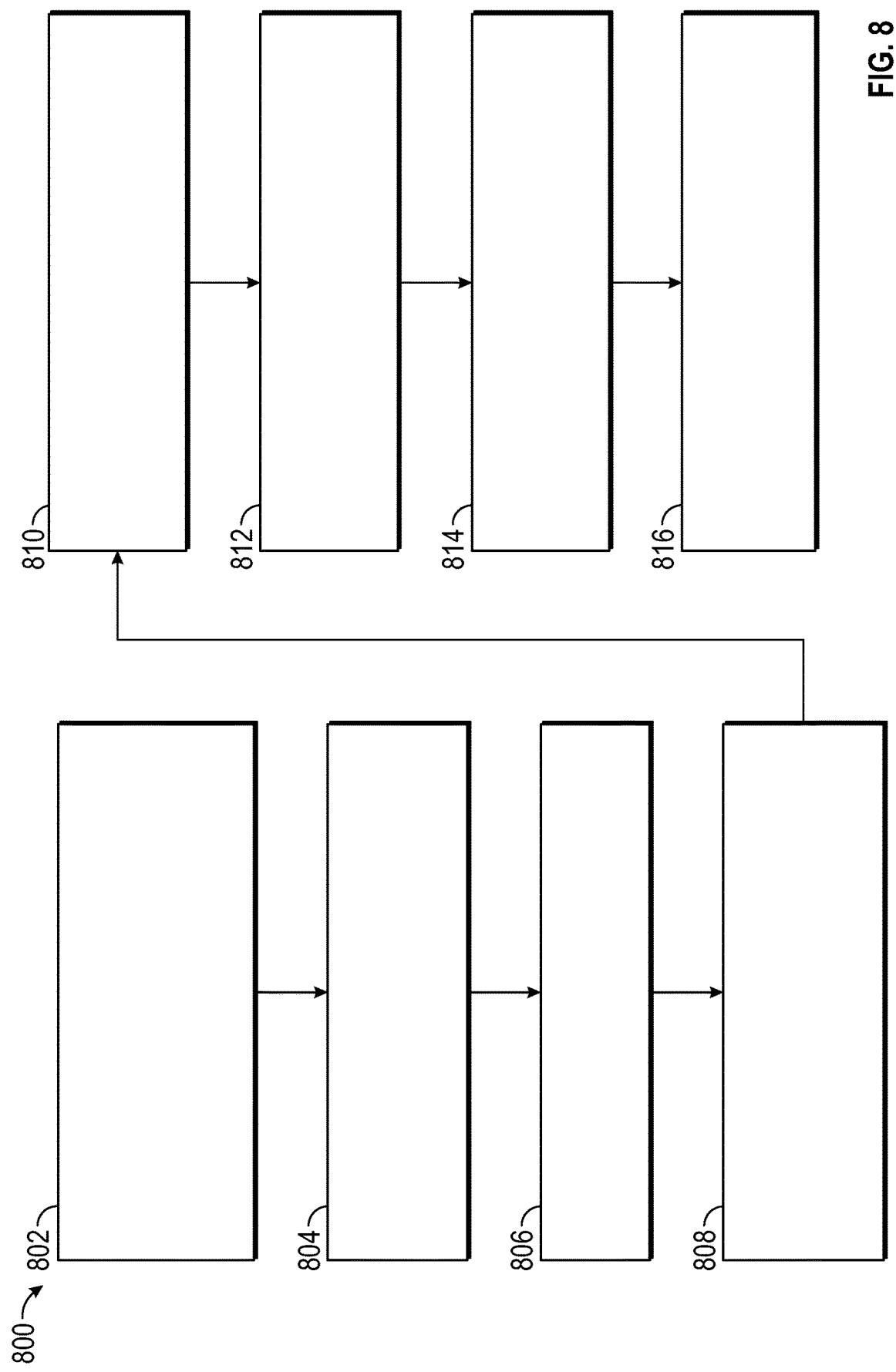
FIG. 8 shows a flowchart of a method for generating the intersection edge using the geometric model outlined in FIGS. 2-7.

FIG. 8 shows a flowchart 800 of a method for generating the intersection edge using the geometric model outlined in FIGS. 2-7.

In box 802, two points are selected along the first road edge 208 and are used to draw the first extension line 302. Also, two points are selected along the second road edge 210 and are used to draw the second extension line 304. Given that the first extension line 302 is based on the coordinates of two points selected from the first road edge 208, the first extension line is described by a suitable linear equation. Similarly, the second extension line 304 is described by a suitable linear equation.

In box 804, the intersection point PI between the first extension line 302 and the second extension line 304 is calculated or located. An intersection angle Δ is then found at the intersection point PI, using the equations for the first extension line 302 and the second extension line 304. In box 806, a nominal turn radius R for the intersection is determined. The nominal turn radius R can be a standardized value or can be a computed value. A tangent distance T is determined using the nominal turn radius and the intersection angle.

In box 808, tie-in points are determined using the tangent distance and the intersection point PI. The first tie-in point lies along the first road edge and is also referred to herein as a point of curvature (PC), which marks the beginning of the curve in the intersection edge 702. The first tie-in point is separated from the point of intersection PI by tangent distance T along the first extension line 302. The second tie-in point lies along the second road edge and is also referred to herein as a point of tangency (PT), which marks the end of the curve in the intersection edge 702. The second tie-in point is separated from the point of intersection PI by tangent distant T along the second extension line 304. A first radial line 602 is extended perpendicular to the first extension line 302 at the first tie-in point. A second radial line 604 is extended perpendicular to the second extension line 304 at the second tie-in point.

In box 810, a turn center (PO) is found as a point of intersection of the first radial line 602 and the second radial line 604. In box 812, the polar coordinates of the first radial line and the second radial line are determined with respect to a reference line 606. In various embodiments, the reference line 606 is an east-west line. A first length $R_N$ of the first radial line 602 is measured between the turn center PO and the first tie-in point PC and the first angle $\theta_N$ is measured between the reference line 606 and the first radial line 602. Similarly, a second length $R_0$ is measured between the turn center PO and the second tie-in point PT and the second angle $\theta_0$ is measured between the reference line 606 and the second radial line 604.

In box 814, the intersection edge 702 is created using the polar coordinates determined in box 812 and the parameterization Eqs. (3) and (4). In box 816, the edge points of the curve are created from the intersection edge 702, the first road edge 208 and the second road edge 210.

Figure 9:
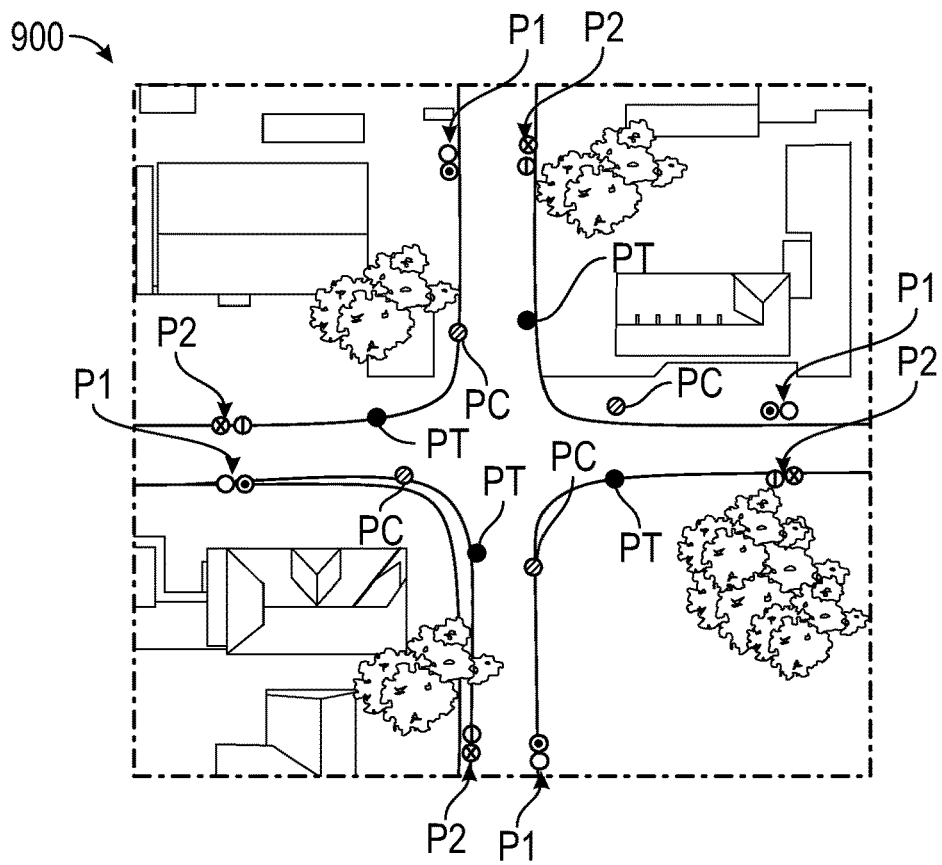
FIG. 9 shows an illustrative map of a 4-leg intersection of two roads meeting at a right angle.
Figure 10:
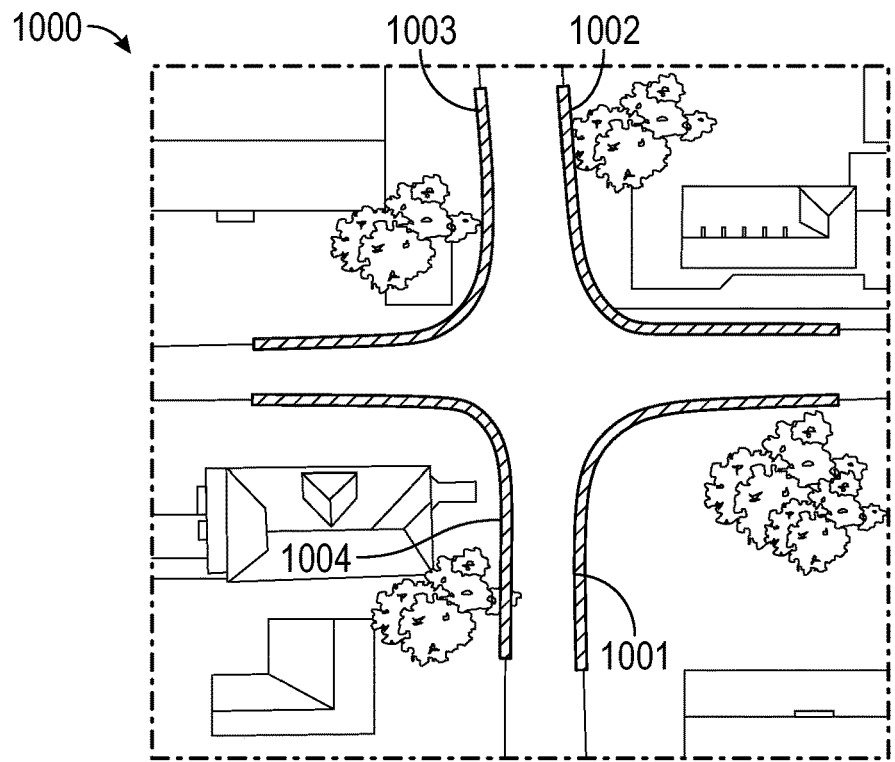
FIG. 10 shows road edges that are constructed using the points drawn into the map of FIG. 9 and the methods disclosed herein.

FIG. 9 shows an illustrative aerial image 900 of an intersection of two roads meeting at a right angle. A first perimeter point P1 and second perimeter point P2, as well as point of curvature PC and point of tangency PT, are drawn in for each of the roads of the intersection. FIG. 10 shows an aerial image 1000 which includes road edges (1001, 1002, 1003, 1004) that are constructed using the points from illustrative aerial image 900 of FIG. 9 and the methods disclosed herein.

Figure 11:
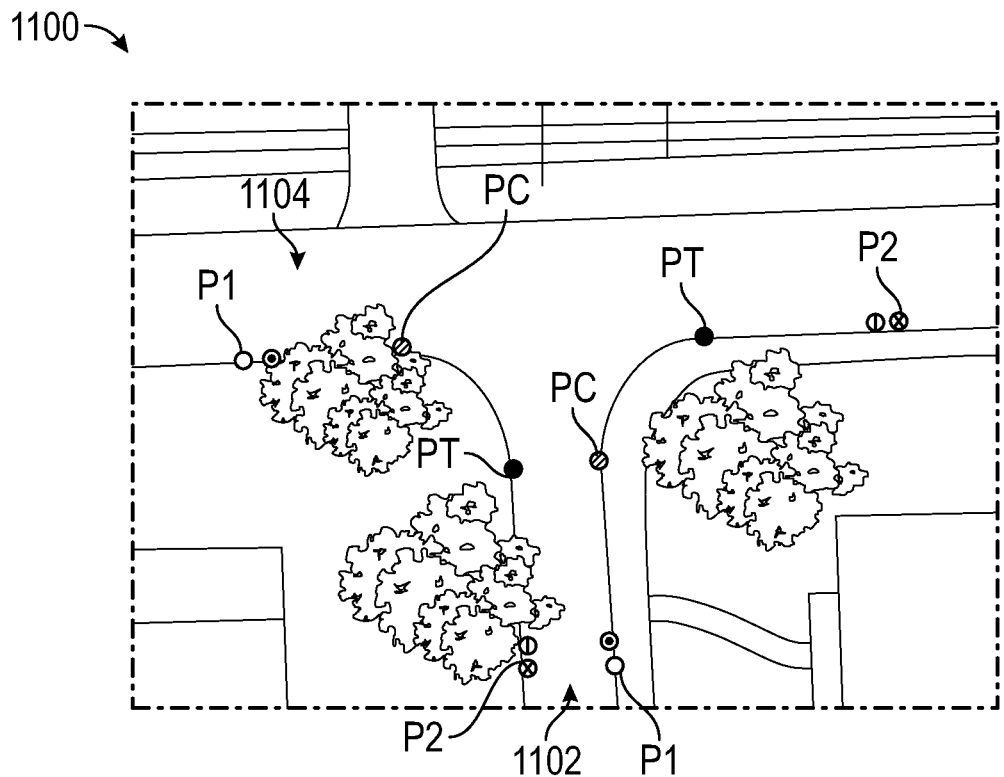
FIG. 11 shows an illustrative map of a T-intersection between a first road and a second road.
Figure 12:
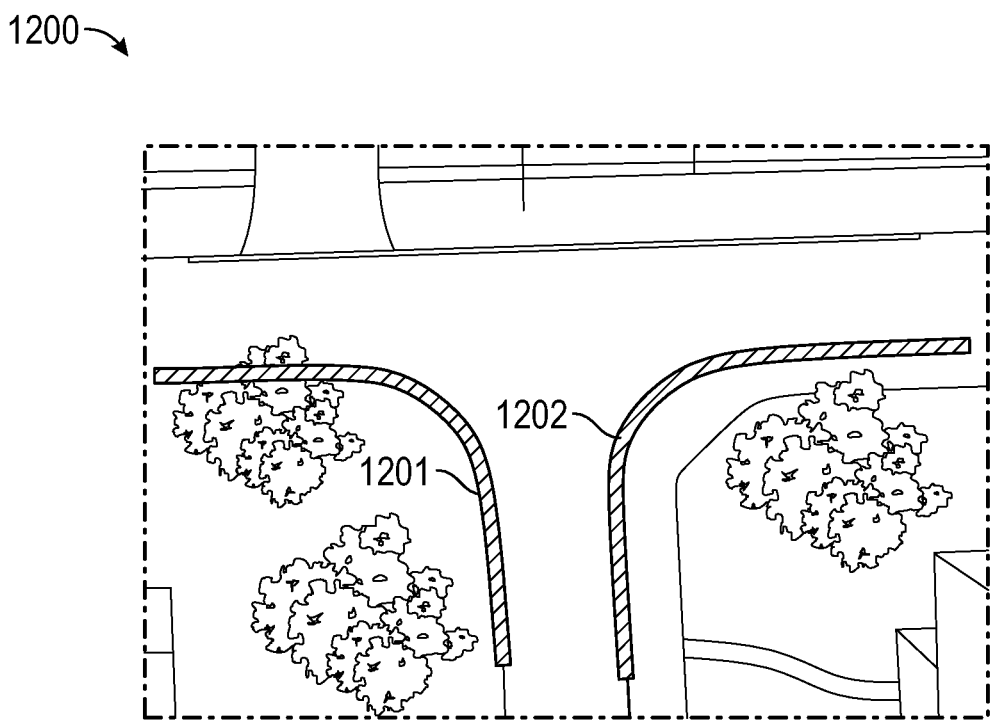
FIG. 12 shows road edges completed using the points drawn into the map of FIG. 11 and the methods disclosed herein.

FIG. 11 shows an illustrative aerial image 1100 of a T-intersection between a first road 1102 and a second road 1104. The first road 1102 ends at the second road 1104 forming a T-intersection. A first perimeter point P1 and second perimeter point P2, as well as point of curvature PC and point of tangency PT, are drawn in for each of the road edges of the intersection. FIG. 12 shows an aerial image 1200 which includes road edges (1201, 1202) completed using the points drawn into illustrative aerial image 1100 of FIG. 11 and the methods disclosed herein.

Although the method disclosed herein of determining an intersection edge is shown as being performed on an aerial image or map, the method can be performed without the need of an aerial image or crowd-sourced vehicle data. In an embodiment, an equation for the first road edge and the second road edge can be received and the calculations for determining the intersection edge can be performed using the first road edge and the second road edge. In an alternate embodiment, a map can be provided that includes the first road edge and second road edge, which can then be pulsed from the map and used independently of the map to determine the intersection edge. Determining the intersection edge without the need for aerial imagery or crowd-sourced vehicle data significantly reduces computational power and time.

Although the method of constructing an instruction edge is discussed with respect to roads entering intersection, this is not meant as a limitation on the invention. In various embodiments, the method can be used to fill gaps in road edges that do not follow an easily defined trajectory. For example, the method can be used to determine a horizontal curve along a roadway or a lane transition such as from a two-lane road to a single lane.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of navigating a vehicle through an intersection, comprising:
   determining, at a remote processor, a first road edge for a first road entering the intersection;
   determining, at the remote processor, a second road edge for a second road entering the intersection, wherein an intersection edge between the first road edge and the second road is unknown;
   drawing a first extension line along the first road edge into the intersection;
   drawing a second extension line along the second road edge into the intersection;
   determining a point of intersection between the first extension line and the second extension line;
   determining a nominal turn radius for the intersection edge based on an intersection angle between the first road edge and the second road edge;
   drawing a circular arc having the nominal turn radius the circular arc being tangent to the first road edge and the second road edge;
   constructing, at the remote processor, the intersection edge that connects a first point on the first road edge to a second point on the second road edge using the nominal turn radius; and
   transmitting the intersection edge to the vehicle for navigation of the vehicle through the intersection using the intersection edge.

2. The method of claim 1, further comprising determining the nominal turn radius for the intersection edge based on an intersection configuration and the intersection angle.

3. The method of claim 2, further comprising determining a tangent distance based on the intersection angle and the nominal turn radius.

4. The method of claim 3, further comprising determining a location of the first point on the first road edge with respect to a point of intersection and the location of the second point on the second road edge with respect to the point of intersection using the tangent distance.

5. The method of claim 4, further comprising determining a turn center of the intersection edge using a first radial line extending from the first point and a second radial line extending from the second point.

6. The method of claim 1, further comprising determining the intersection edge by interpolating an intersection radial line based on rotation angle to coincide with the first point and the second point.

7. The method of claim 1, wherein the intersection includes at least one of a horizontal curve and a lane transition.

8. A map server for vehicle navigation, comprising:
   a processor configured to:
      determine a first road edge for a first road entering an intersection;
      determine a second road edge for a second road entering the intersection,
   wherein an intersection edge between the first road edge and the second road is unknown;
      draw a first extension line along the first road edge into the intersection;
      draw a second extension line along the second road edge into the intersection;
      determine a point of intersection between the first extension line and the second extension line;
      determine a nominal turn radius for the intersection edge based on an intersection angle between the first road edge and the second road edge;
      draw a circular arc having the nominal turn radius the circular arc being tangent to the first road edge and the second road edge;
      construct the intersection edge that connects a first point on the first road edge to a second point on the second road edge using the nominal turn radius; and
   a communication device configured to communicate the intersection edge to a vehicle for navigation through the intersection using the intersection edge.

9. The map server of claim 8, wherein the processor is further configured to determine the nominal turn radius for the intersection edge based on an intersection configuration and the intersection angle.

10. The map server of claim 9, wherein the processor is further configured to determine a tangent distance based on the intersection angle and the nominal turn radius.

11. The map server of claim 10, wherein the processor is further configured to determine a location of the first point on the first road edge with respect to a point of intersection and the location of the second point on the second road edge with respect to the point of intersection using the tangent distance.

12. The map server of claim 11, wherein the processor is further configured to determine a turn center of the intersection edge using a first radial line extending from the first point and a second radial line extending from the second point.

13. The map server of claim 12, wherein the processor is further configured to determine the intersection edge by interpolating an intersection radial line based on rotation angle to coincide with the first point and the second point.

14. The map server of claim 8, wherein the intersection includes at least one of a horizontal curve and a lane transition.

15. A system for navigating a vehicle, comprising:
    a remote processor configured to:
       determine a first road edge for a first road entering an intersection;

determine a second road edge for a second road entering the intersection wherein an intersection edge between the first road edge and the second road is unknown;

draw a first extension line along the first road edge into the intersection;

draw a second extension line along the second road edge into the intersection;

determine a point of intersection between the first extension line and the second extension line;

determine a nominal turn radius for the intersection edge based on an intersection angle between the first road edge and the second road edge;

draw a circular arc having the nominal turn radius the circular arc being tangent to the first road edge and the second road edge;

construct the intersection edge that connects a first point on the first road edge to a second point on the second road edge using the nominal turn radius; and a vehicle processor configured to navigate the vehicle through the intersection using the intersection edge.

16. The system of claim 15, wherein the remote processor is further configured to determine the nominal turn radius for the intersection edge based on an intersection configuration and the intersection angle.

17. The system of claim 16, wherein the remote processor is further configured to determine a tangent distance based on the intersection angle and the nominal turn radius and determine a location of the first point on the first road edge with respect to a point of intersection and the location of the second point on the second road edge with respect to the point of intersection using the tangent distance.

18. The system of claim 17, wherein the remote processor is further configured to determine a turn center of the intersection edge using a first radial line extending from the first point and a second radial line extending from the second point.

19. The system of claim 17, wherein the remote processor is further configured to determine the intersection edge by interpolating an intersection radial line based on rotation angle to coincide with the first point and the second point.

20. The system of claim 17, wherein the intersection includes at least one of a horizontal curve and a lane transition.

* * * * *